Feb. 14, 1961 W. H. SILVER ET AL 2,971,591
FLOATING HITCH DEVICE
Filed April 26, 1956 3 Sheets-Sheet 1

INVENTORS.
WALTER H. SILVER
WILLIAM V. LOHRMAN
BY
ATTORNEYS

Feb. 14, 1961 W. H. SILVER ET AL 2,971,591
FLOATING HITCH DEVICE
Filed April 26, 1956 3 Sheets-Sheet 2
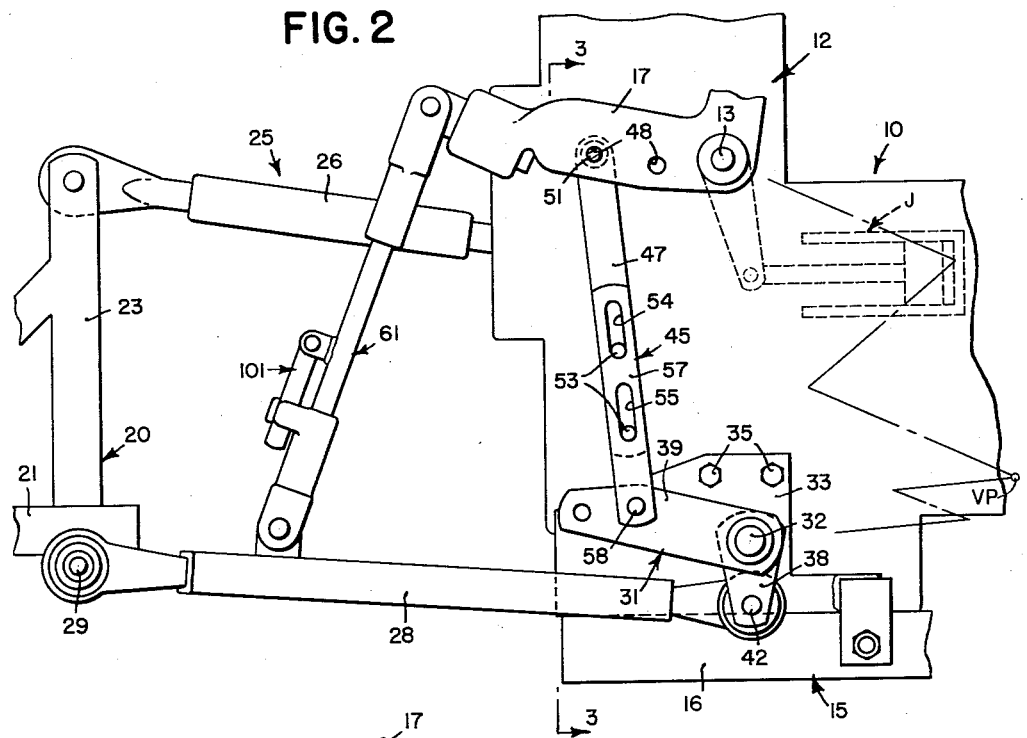
FIG. 2
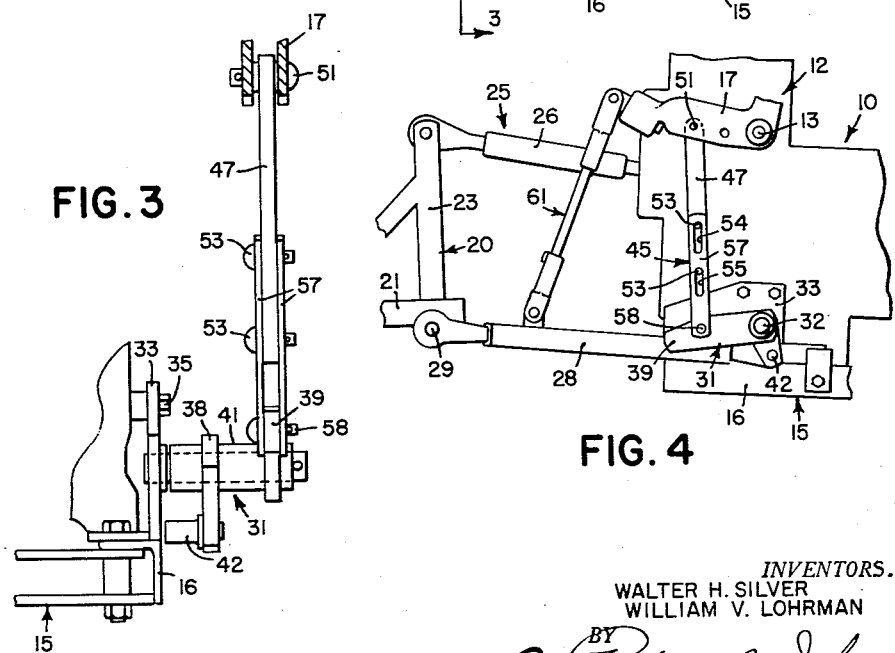
FIG. 3
FIG. 4
INVENTORS.
WALTER H. SILVER
WILLIAM V. LOHRMAN
BY
ATTORNEYS Feb. 14, 1961   W. H. SILVER ET AL   2,971,591
FLOATING HITCH DEVICE
Filed April 26, 1956   3 Sheets-Sheet 3
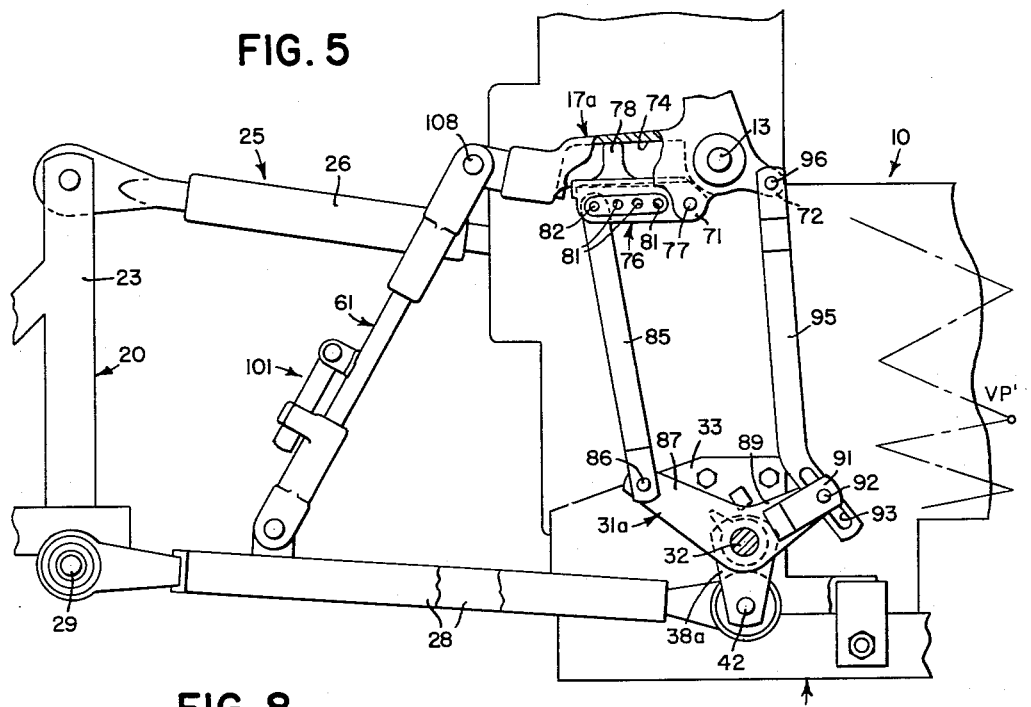
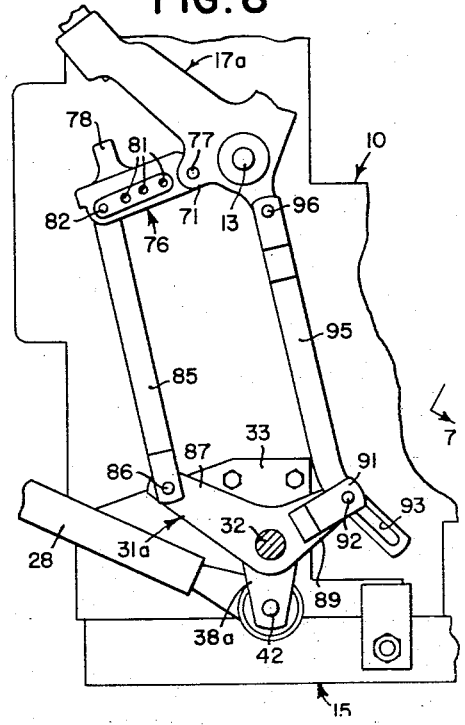
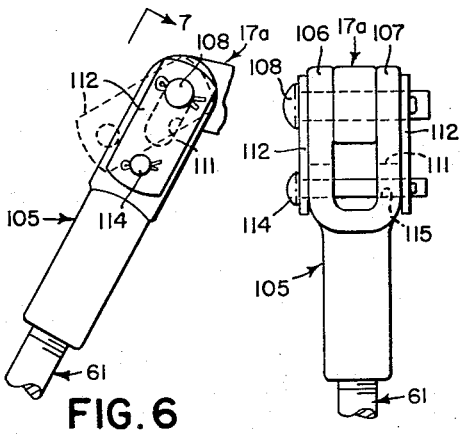
INVENTORS.
WALTER H. SILVER
WILLIAM V. LOHRMAN
BY
ATTORNEYS United States Patent Office 2,971,591
Patented Feb. 14, 1961

2,971,591
FLOATING HITCH DEVICE

Walter H. Silver, Moline, Ill., and William V. Lohrman, Davenport, Iowa, assignors, by mesne assignments, to Deere & Company, a corporation of Delaware Filed Apr. 26, 1956, Ser. No. 580,893

18 Claims. (Cl. 172—444)

The present invention relates generally to agricultural implements and more particularly to tractor-implement combinations in which, in operation, the implement is adapted to follow the ground but, for transport purposes, is adapted to be raised into a position entirely out of contact with the ground by power derived from the tractor.

The object and general nature of this invention is the provision of a tractor-implement combination of the type just mentioned, wherein the implement has considerable flexibility so as to accommodate movement of the outfit over uneven ground, through swales, and over ridges or the like, yet the implement is readily raised off the ground for transport purposes by power derived from the tractor.

More specifically, it is a feature of this invention to provide a pair of bell cranks mounted on the lower rear portion of the tractor and adapted to pivotally receive the draft links so that the draft pull is transmitted from the tractor to the implement through the bell crank means, with means limiting the permissive movement of the bell crank means so as to accommodate a controlled amount of flexibility in a generally vertical direction of the implement relative to the tractor. Particularly, it is a feature of this invention to provide lost-motion means between the bell crank means and the lift arms on the tractor by which power is directed to the draft links to raise the implement into a transport position, such lost-motion means providing for a limited or controlled amount of vertical flexibility of the implement relative to the tractor. Still further, it is a feature of this invention to provide an adjustable connection between the bell crank means and the lift arm means so as to adapt the hitch mechanism to various kinds of implements, particularly to vary the virtual hitch point by which the hitch mechanism connects the implement with the tractor. Thus, by changing the connection with the lift arm means, the virtual hitch point may be arranged in a high postiion, or a low position, as desired, for varying the amount of weight transfer or down pressure exerted in operation against the tractor by the implement.

These and other objects and advantages of the present invention will be apparent to those skilled in art after a consideration of the preferred form of the invention, shown by way of illustration in the accompanying drawings.

In the drawings:

Fig. 2 is a side view of the hitch device, showing the same as connected to an associated implement.

Fig. 3 is a sectional view taken generally along the line 3—3 of Fig. 2, the lower draft link being omitted for purposes of clarity.

Fig. 4 is a diagrammatic view showing the action of the hitch linkage when the outfit passes over a ridge or hump.

Fig. 5 is a view similar to Fig. 2, showing a modified form.

Fig. 6 is an enlarged fragmentary view, showing a modified form of lift link, wherein a certain amount of lost-motion is provided.

Fig. 7 is a rear view of the linkage shown in Fig. 6.

Fig. 8 is a view similar to Fig. 5, showing the raised position of certain of the linkages shown in Fig. 5.

Figure 1:
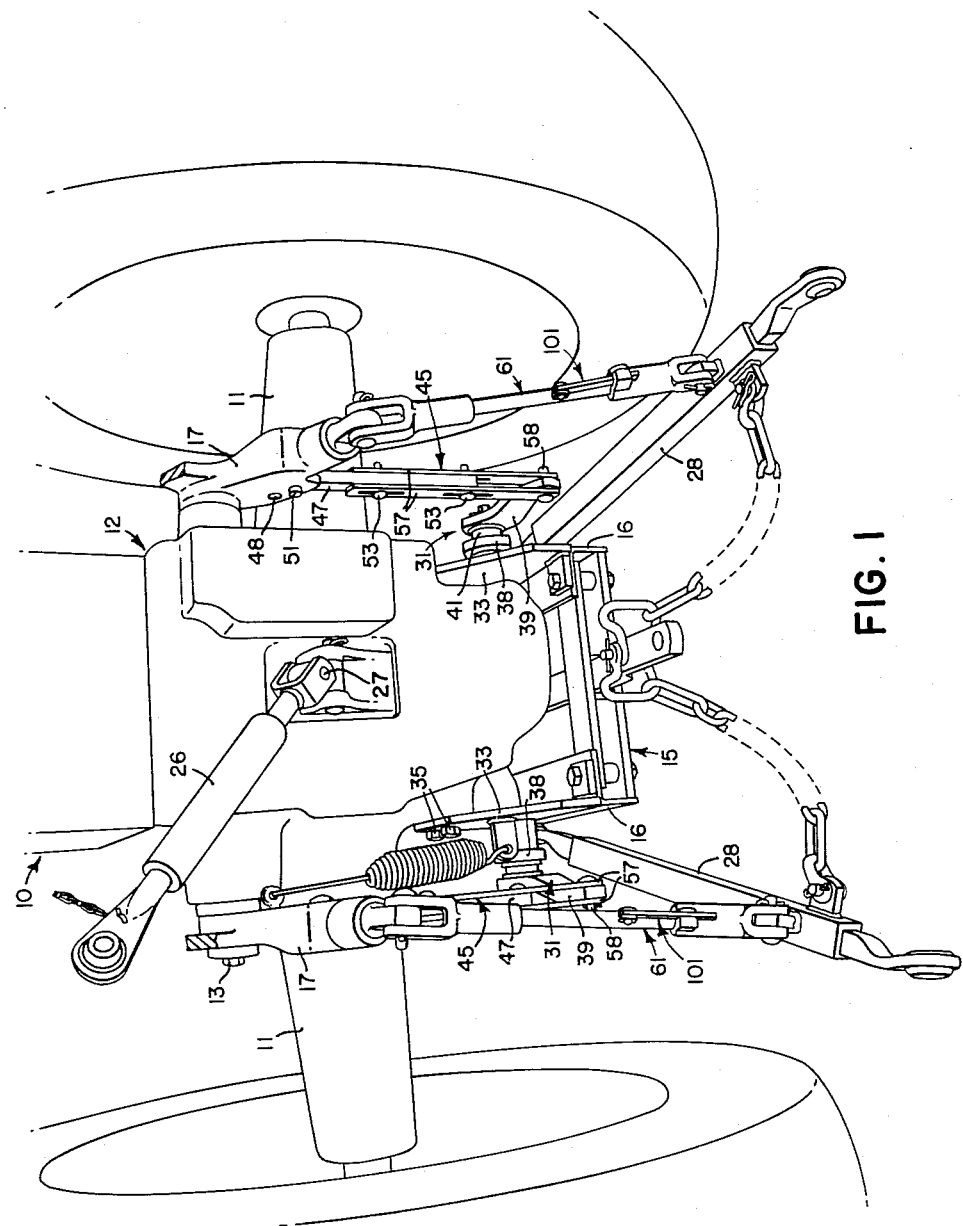
Fig. 1 is a fragmentary perspective view of a hitch device, constructed according to the principles of the present invention, Fig. 1 being a rear view showing the hitch device disconnected from an associated implement.

Referring first to Fig. 1, the tractor-implement combination of the present invention includes a generally conventional farm tractor 10 having laterally outwardly extending rear axle housings 11 and a power lift unit 12 of the type that includes a transversely disposed rockshaft 13 connected to be actuated by a power unit in the form of a hydraulic jack J (Fig. 2) of the one-way acting type that may be constructed, for example, along the lines of the power lift mechanism shown in the U.S. patent to Chambers et al. 2,437,875, to which reference may be had if necessary. The tractor 10 also includes in the lower rear portion thereof a drawbar support structure 15 that includes right and left hand angle members 16 rigidly fastened in any suitable way to the lower rear portion of the tractor. A pair of lift arms, each indicated by the reference numeral 17 and together constituting a lift arm means, are connected to the ends of the rockshaft 13.

The implement chosen to illustrate the principles of the present invention is shown as a multi-bottom plow 20 that includes fore-and-aft extending frame means 21 to which a plurality of plow bottoms are connected. The frame 21 includes a generally vertical mast section 23. The implement 20 is shown as connected with the tractor 10 by means of hitch means indicated in its entirety by the reference numeral 25 and with which the present invention is particularly concerned.

The hitch structure 25 includes, among other things, an upper or compression link 26 connected at its rear end with the upper portion of the mast structure and at its forward end with the tractor 10, the latter connection being established by pivot means 27 shown in Fig. 1. The connections between the ends of the upper link 26 and the implement and tractor are in the nature of ball and socket joints to provide for generally universal movement of one part with respect to the other. A pair of lower or draft links 28 are connected, as by ball and socket joints, with right and left hand studs 29 that extend laterally outwardly at each side of the plow 20, preferably at the lower or forward portion of the mast structure 23. To connect the forward end of the draft links 28 with the tractor, we provide bell crank means in the form of a pair of bell cranks 31, each being rockably mounted on a stub shaft 32 fixed to a vertical bracket 33 that, in turn, is supported on the associated drawbar support angle 16 and on an adjacent portion of the rear axle housing of the tractor, being fastened to the latter by bolt means 35 or the like. Each stub shaft 32 is rigidly fixed to the associated plate 33, and each bell crank 31 includes a generally downwardly extending arm section 38 and a generally rearwardly extending arm section 39, both sections being securely fixed, as by welding, to a sleeve section 41 that is rockably mounted on the associated stub shaft 32. The lower end of each downwardly extending bell crank arm 38 carries a stud 42 that receives the forward end of the associated draft link 28, the latter being connected to its associated stud 42 by ball and socket means or the like.

It will be noted that, as so far described, the implement 20 is connected with the tractor 10 through upper and lower links 26 and 28 and is capable of swinging both laterally and vertically relative to the tractor. The outer ends of the rearwardly extending bell crank arms 39 are connected with the lift arm means 17 by lost-motion means indicated generally by the reference numeral 45. Each lost-motion means provides for a limited amount of movement of each bell crank 31 relative to the associated lift arm 17, and to this end each lost-motion means 45 includes an upper part 47 pivotally connected with the rear end portion of the associated lift arm 17 at any one of a plurality of selected points, each determined by openings 48 formed in the two side sections 49 that constitute the rear end portion of each lift arm 17. A pin 51 is disposed in any set of openings for connecting the upper end of the part 47 to the lift arm 17. The lower end of the part 47 carries a pair of pins or studs 53 that are disposed in slots 54 and 55 formed in a pair of strap members 57 that extend downwardly and are pivotally connected, as at 58, with the rear end portion of the associated bell crank arm 39. The lengths of the slots 54 and 55 determine the amount of lost-motion provided between the parts 39 and 17. A lift link 61 is connected between the rearmost portion of each arm 17 and the associated draft link 28 at that side of the tractor.

The operation of the device of the present invention is substantially as follows.

Figure 2 shows the parts in the positions they occupy when plowing substantially level ground under normal operating conditions. The draft pull is transmitted from the tractor to the implement through the bell crank means, the draft pull reacting through the bell cranks 31 against the lift arms 17, and the latter, in turn, react against the rear portions of the lower draft links 28. In other words, the draft pull is transmitted by the bell cranks to the lift arms 17 as an upwardly directed force, but upward movement of the lift arms 17 is prevented by virtue of the connection with the rear portions of the lower draft links 28. If, for example, the outfit should be required to travel through a depression or swale, the implement as a whole moves upwardly relative to the tractor, and since such movement also entails an upward movement of the lift arm 17, which upward movement is without restraint since the power lift mechanism is a one-way hydraulic arrangement, the upward movement of the lift arm 17 accommodates the clockwise rotation of the bell cranks 31, with the result that the rear end of the plow is free to move upwardly as the outfit travels through the depression or swale. The points of connection between the lost-motion links 45 and the lift arms 17 are made so that the resulting virtual hitch point, indicated in Fig. 2 by the reference characters VP, is sufficiently high so that a substantial amount of vertical component of the draft force is imposed on the tractor to insure adequate traction at all times.

When the outfit travels over a ridge or the like, the parts take the positions indicated generally in Fig. 4, in which it will be noted that the rear end of the plow 20, due principally to the weight of the plow, especially if the latter is a 3- or 4-bottom plow, remains at the desired operating depth, yet the rear end of the plow can move downwardly relatively to the front end of the plow since the bell crank means is free to swing in a counterclockwise direction as the outfit passes over the ridge, with the result that the lower draft links 28 are free to momentarily shift forwardly, as permitted by the slots 54 and 55, movement of the bell cranks 31 relative to the associated lift arm 17 being limited by the ends of the slots engaging the associated pins 53. As will be clear, as soon as the outfit again reaches level ground, the bell cranks 31 shift in a clockwise direction until the rearwardly extending arms 39 react through the links 45 against the lift arm 17, the parts returning to the relative positions shown in Fig. 1.

When it is desired to lift the plow into a transport position, the tractor power lift is operated to swing the lift arms 17 upwardly, and during this movement a lifting effort is exerted through the lift links 61 against the rear portions of the draft links 28. Since there is no draft pull exerted against the bell cranks 31, the weight of the plow 20 causes the bell cranks 31 to swing in a counterclockwise direction, but movement in this direction is limited by the pins 53 moving to the lower ends of the slots 54 and 55. Thus, the upward movement of the lift arms 17 acts not only through the lift links 28 to raise the front bottoms of the plow before the rear bottoms but also acts through the bell cranks 31, once the lost-motion has been taken up, to raise the plow to a substantially level position upwardly into a transport position.

During the passage of the outfit over a ridge or the like, as illustrated in Fig. 4, the upper link 26, normally under compression, may momentarily be subjected to tension forces when the parts occupy the positions shown in Fig. 4.

In the hitch device shown in Fig. 5, each lift arm is connected with the associated bell crank to which the forward end of the associated draft link is connected, by two links, one of which transmits the reaction of the draft pull to the lift arm. Each lift arm is connected with the associated bell crank as just described, and in this kind of arrangement the degree of reaction to which the lift arms are subjected can be adjusted by connecting the links with the associated lift arms in any one of several available positions. The second link of the hitch device of Fig. 5 is connected between each bell crank and the associated lift arm in a way so as to function only during the lifting-to-transport range of movement of the lift arms, providing an arrangement in which the rear portion of a relatively long implement, such as a multi-bottom plow, is carried with adequate clearance at the rear, but without raising the rear portion of the implement more than is necessary, thereby preventing the tractor lift system from being overstressed.

Referring now to Fig. 5, parts that are identical, or substantially so, with parts previously described have been indicated by the same reference numerals.

In Fig. 5, the power lift rockshaft 13 of the tractor 10 is provided with a lift arm 17a at each side of the tractor, the arms 17a being similar to the arms 17 described above except that two apertured depending lugs 71 and 72 are provided for each arm, and each arm 17a includes the downwardly opening hollowed section 74 into which a portion of a floating arm 76 extends. The arm 76 is pivotally connected, as at 77, to the associated lug 71 and includes an abutment section 78 that extends into the recess 74 and engages the adjacent portion of the arm when a rearward pull is transmitted to the draft links 28 and the latter act to shift the bell cranks 31a in a clockwise direction as viewed in Fig. 5. Each floating arm 76 is provided with a plurality of apertures 81 to optionally receive a pivot pin 82 that connects the upper end of the associated reaction link 85 with the floating arm 76. The lower end of the link 85 is pivotally connected, as at 86, to an arm 87 of the bell crank 31a. The depending arm sections 38a of the arms 31a are connected to the rear ends of the associated draft links 28, as in the construction shown in Figs. 1–4. Each bell crank 31a includes a third arm section 89 that carries a hammer strap 91, the arm 89 and the hammer strap 91 having aligned apertures in which a pin 92 is disposed. The pin 92 extends through a slot 93 in the lower end of a forward link 95, the upper end of which is connected, as by pivot 96, with the forward apertured lug 72 on the associated lift arm 17a.

The operation of this form of the invention is substantially as follows.

Fig. 5 shows the parts in the positions they occupy when plowing substantially level ground under normal operating conditions. The bell cranks 31a, there being one at each side of the tractor, receive the draft pull transmitted through the lower draft links 28, and consequently the bell cranks 31a tend to rotate in a clockwise direction as viewed in Fig. 5. This exerts a thrust in an upward direction through the associated links 85 against the floating arms 76, causing the abutments 78 thereof to act against the associated lift arms 17a, and the reaction of these portions are transmitted to the draft links 28 through the associated lift links 61.

When the links 85 are connected to the floating arms 76 in the forwardmost of the openings 81, the hitch structure 25 provides a virtual hitch point VP¹ that lies in a forward and relatively low position, more or less adjacent to the front end of the tractor. However, when the links 85 are connected to the more rearward openings 81 the virtual hitch points lie progressively rearwardly and at higher positions.

When it is desired to eliminate substantially all bell crank action, the pivots 77 are removed from the floating arm 76, the latter disconnected, and the upper ends of the links 85 are connected by the pins 77 directly to the rear lugs 71.

During the depth adjusting range of movement of the lift arms 17a, the bell cranks 31a normally move with the lift arms 17a, except when the links 85 are connected directly to the lugs 71, but during this movement the pin 92 moves idly within the slot 93. However, about the time the plow bottoms emerge from the ground and move upwardly toward their transport position, the forces on the draft links 28 are reversed; that is, instead of being subjected to tensile forces, as when draft is transmitted from the tractor to the plow after the plow bottoms clear the ground, the weight of the plow, particularly the rear portion thereof, tends to shift the links 28 forwardly, subjecting the latter to compression. This then rotates the bell cranks 31a in a counterclockwise direction as viewed in Fig. 5, with the result that the pins 92 in the bell crank arms 89 move upwardly in the slots 93 and come into engagement with the upper ends of the slots in the links 95, which stops any further counterclockwise movement of the bell cranks 31a. Then as the lifting of the plow to its transport position continues, a downward force is exerted through the links 95 onto the bell crank arms 89, thus resulting in a certain amount of clockwise movement of the bell cranks 31a, the extent of which is determined by the positions of the pivots 92 and 96, and associated parts. The parts are so constructed and arranged that when the plow is in a transport position, the rear end has adequate clearance with respect to the ground surface, but the tractor power lift is not called upon to raise the implement any more than is necessary to provide the adequate clearance that is necessary. During this latter stage of clockwise movement of the bell cranks 31a, such movement is permitted by virtue of the lost motion between the floating arms 76 and the lift arms 17a. This lost motion becomes available when the forces on the draft links 28 are reversed, as described above.

As will best be seen from Fig. 1, each of the lift links 61 is provided with adjusting means 101 by which the effective length of each link means may be adjusted, as desired, and since the rockshaft 13 extends through the tractor housing and carries a lift arm means 17 at each end thereof, the lateral position of an implement connected to the rear ends of the arms or draft links 28 is determined by the tractor. In some cases, however, such as relatively wide implements and those having their own gauge wheels, it is desirable to permit the implement to tilt laterally relative to the tractor, and to this end, the form of the invention shown in Fig. 5 includes a modified lift link means in which limited vertical movement of each lift link relative to the associated lift arm is provided. However, the details of this modified lift link means are shown at a larger scale in Fig. 6 and are omitted for the sake of clarity from Fig. 5.

Referring first to Fig. 6, the upper end of the link means 61 includes a yoke member 105, side portions 106 and 107 of which are adapted to be disposed on opposite sides of the rear ends of the associated power lift arm 17a, the end of the lift arm 17a being apertured to receive a pivot member 108 that is disposed at the upper end of each of the lift links 61. As will best be seen from Fig. 7, the pivot member 108 extends through elongated slots 111 formed in each side portion 106 and 107 of the yoke member 105, and the pivot member 108 also extends through openings in a pair of lockout straps 112. The lower ends of the straps 112 are apertured to receive a releasable pin 114 that is adapted to extend through not only the apertures in the lower ends of the straps 112 but also through a transverse aperture 115 formed in the yoke 105 adjacent the lower ends of the slots 111. The pin 114, when it is disposed through the openings in the lower ends of the straps 112 and in the openings 115 in the yoke member, serves, in conjunction with the pivot member 108, to lock the link means 61 against generally vertical movement relative to the associated lift arm 17a, but if some permissive movement is desired, all that it is necessary to do is to remove the pin 114 from the lock-out straps 112 and from the openings 115 in the yoke member, lifting the strap members away from the yoke member, and then reinsert the pin 114 in the openings 115 so as to have the pin available when again permissive movement is not desired. With the straps 112 thus disconnected from the pin 114 and the yoke 105, the pivot member 108 may move relative to the yoke member the distance provided by the slots 111, the pivot member and associated parts thus providing for a limited amount of relative movement between each lift link means and the associated lift arm 17a.

While we have shown and described above the preferred structure in which the principles of the present invention have been incorporated, it is to be understood that our invention is not to be limited to the particular details, shown and described above, but that, in fact, widely different means may be employed in the practice of the broader aspects of our invention.

What we claim, therefore, and desire to secure by Letters Patent is:

1. The combination with a tractor having lift arm means and a power lift system for operating said lift arm means, of a ground following implement, means including lower link means connected at their rear ends with said implement, a first means connecting the lift arm means with the lower link means, bell crank means pivotally mounted on the tractor and having a first arm means pivotally receiving the forward ends of said lower link means, whereby the pull of the tractor and the soil resistance acting against the implement tend to cause said bell crank to rotate in one direction, said bell crank means having a second arm means, and a second means connecting the second arm means with said lower link means, said bell crank arms extending generally at a right angle, one with respect to the other, whereby any resistance to upward movement of the lower link means acts to prevent rotation of said bell crank means in said one direction, and said connecting means including lost motion means adapted to transmit movement of said bell crank in said one direction to said lift arm means as a lifting force but accommodating upward movement of said lift arm means without entailing movement of said bell crank means.

2. The combination with a tractor having a power lift system that includes lift arm means and power means for raising said lift arm means, of a ground following implement, generally fore-and-aft extending upper and lower link means connected at their rear ends with the implement, means connecting the forward end of said upper link means with the tractor, lift link means connecting said lower link means with said lift arm means, bell crank means mounted on the lower rear portion of the tractor for free swinging movement relative thereto and having one arm portion connected with the forward ends of said lower link means, means including lost motion means connecting another arm portion of said bell crank means and said lift arm means.

3. The combination with a tractor having a power lift system that includes lift arm means and power means for raising said lift arm means, of a ground following implement, generally fore-and-aft extending upper and lower link means connected at their rear ends with the implement, means connecting the forward end of said upper link means with the tractor, lift link means connecting said lower link means with said lift arm means, bell crank means swingably mounted on the lower rear portion of the tractor and having one arm portion connected with the forward ends of said lower link means, and a connection between another arm portion of said bell crank means and said lift arm means, said last mentioned connection having limited movement relative to the lift arm means, whereby said bell crank means may move relative to the tractor to accommodate a limited amount of pitching of the implement relative to the tractor when the implement and tractor travel across swales and over ridges and the like.

4. A hitch device for connecting a relatively long implement with a tractor having a power controlled lift arm means, said hitch device comprising upper and lower link means adapted to be swingably connected with the implement, means connecting said lift arm means with the lower link means, means to swingably connect the upper link means with the tractor, bell crank means pivotally mounted on the tractor and having a fore-and-aft movable portion pivotally connected with the forward end of said lower link means and a generally vertically movable portion, and a lost motion connection between said latter movable portion and said lift arm means.

5. The combination with a tractor having a power lift system that includes lift arm means and power means including a one-way hydraulic jack for raising said lift arm means and a ground following implement, of hitch means to connect said implement with the tractor, comprising a pair of lower draft links connected at their rear ends to the implement, lift link means connecting said lift arm means with said draft links, upper link means connected at its rear end to an upper portion of the implement and at its forward end with the tractor, bell crank means rockably connected with the tractor and having a first arm means pivotally receiving the forward ends of said lower link means, a pair of lift links connected between said lower draft links and said lift arm means, and lost motion means connecting a second bell crank arm means with said lift arm means.

6. The combination with a tractor having a power lift system that includes lift arm means and power means including a one-way hydraulic jack for raising said lift arm means, a ground-following implement, a pair of lower generally horizontal draft links pivoted at their forward ends to the tractor and lift means connecting said draft links with said lift arm means, of lost-motion means connecting the lower fore part of the implement with the tractor, said lost-motion means comprising a first part having a limited amount of movement relative to said lift arm means in a direction relative thereto that corresponds to the direction of lowering movement of said lift arm means, whereby the lower fore part of the implement may move relative to the lift arm means in a direction that provides for lowering of the rear portion of the implement, and stop means acting between said part and said lift arm means to limit the lost-motion movement whereby movement of said lift means acts through said lost-motion means and said draft links to raise said implement.

7. The combination with a tractor having a power lift system that includes lift arm means, power means including a one-way hydraulic jack for raising said lift arm means, and a drawbar support on the lower rear part of the tractor, of a ground-following implement, a pair of bell cranks swingably mounted on the drawbar support and each including a generally downwardly extending arm and a generally rearwardly extending arm, an upper link connected between the implement and the tractor, a pair of lower generally horizontal draft links pivoted at their forward ends to the downwardly extending bell crank arms and at their rear ends to the lower fore part of said implement, lift means connecting said draft links with said lift arm means, and lost-motion means connecting the rearwardly extending bell crank arms with the lift arm means, said lost-motion means comprising parts connected with the outer ends of said rearwardly extending bell crank arms and having a limited amount of movement relative to said lift arm means in a generally vertical direction relative thereto, whereby the rear part of the implement may move downwardly relative to the forward part to provide for lowering of the rear portion of the implement relative to the fore part of said implement, and said lost-motion means including stop means acting between said parts and said lift arm means to limit the lost-motion movement, whereby upward movement of said lift means acts through said lost-motion means and said draft links to raise both the front and rear parts of said implement.

8. The combination with a tractor having a power lift system that includes lift arm means and power means including a one-way hydraulic jack for raising said lift arm means, a ground-following implement, an upper link connection between said implement and the tractor, a motion transmitting part movably mounted on the tractor, a first connection between said part and said lift arm means, a second connection between said part and the lower forward part of the implement, whereby the reaction of the draft pull is transmitted from the implement through said part to the lift arm means, and one of said first and second connections including lost-motion means accommodating a limited amount of forward movement of the lower part of the implement relative to the tractor.

9. The combination with a tractor having a power lift system that includes lift arm means, power means including a hydraulic jack for raising said lift arm means, and a drawbar support on the lower rear part of the tractor, of a ground-following implement, a pair of bell cranks swingably mounted on the drawbar support and each including a generally downwardly extending arm and a generally rearwardly extending arm, an upper link connected between the implement and the tractor, a pair of lower generally horizontal draft links pivoted at their forward ends to the downwardly extending bell crank arms and at their rear ends to the lower fore part of said implement, lift means connecting said draft links with said lift arm means, and lost-motion means connecting the rearwardly extending bell crank arms with the lift arm means, said lost-motion means comprising parts connected with the outer ends of said rearwardly extending bell crank arms and having a limited amount of movement relative to said lift arm means in a generally vertical direction relative thereto, whereby the rear part of the implement may move downwardly relative to the forward part to provide for lowering of the rear portion of the implement relative to the fore part of said implement, and said lost-motion means including stop means acting between the bell cranks and said lift arm means to limit said lost-motion, whereby upward movement of said lift means acts through said lost-motion means and said draft links to raise both the front and rear parts of said implement into a transport position.

10. The combination with a tractor having a power lift system that includes lift arm means, power means including a one-way hydraulic jack for raising said lift arm means, and a drawbar support on the lower rear part of the tractor, of a ground-following implement, a pair of bell cranks swingably mounted on the drawbar support and each including a generally downwardly extending arm and a generally rearwardly extending arm, an upper link connected between the implement and the tractor, a pair of lower generally horizontal draft links pivoted at their forward ends to the downwardly extending bell crank arms and at their rear ends to the lower fore part of said implement, lift means connecting said draft links with said lift arm means, and lost-motion means connecting the rearwardly extending bell crank arms with the lift arm means, said lost-motion means comprising parts connected with the outer ends of said rearwardly extending bell crank arms and having a limited amount of movement relative to said lift arm means in a generally vertical direction relative thereto, whereby the rear part of the implement may move downwardly relative to the forward part to provide for lowering of the rear portion of the implement relative to the fore part of said implement, and said lost-motion means including links, each connected at its ends with the associated bell crank and lift arm means, one of the link connections including a second lost-motion means.

11. A hitch device for connecting a relatively long implement with a tractor having a power controlled lift arm means, said hitch device comprising upper and lower link means adapted to be swingably connected with the implement, means connecting said lift arm means with the lower link means, means to swingably connect the upper link means with the tractor, bell crank means pivotally mounted on the tractor and having a fore-and-aft movable portion pivotally connected with the forward end of said lower link means and a generally vertically movable portion, generally vertically disposed link means pivotally connected at its lower end with said vertically movable portion of the bell crank means, a floating arm pivoted at one end to said lift arm means and freely swingable in one direction away from said lift arm means, means connecting the upper end of said last mentioned link means with said floating arm, and means connected to limit movement of said floating arm away from said lift arm means.

12. The invention set forth in claim 11, further characterized by said motion limiting means comprising a link connected to act between said lift arm means and said bell crank means.

13. A hitch device for connecting a relatively long implement having ground working tool means with a tractor having a power controlled lift arm means, said hitch device comprising upper and lower link means adapted to be swingably connected with the implement, means connecting said lift arm means with the lower link means, means to swingably connect the upper link means with the tractor, bell crank means pivotally mounted on the tractor and having a fore-and-aft movable portion pivotally connected with the forward end of said lower link means and a generally vertically movable portion, means including lost-motion connecting said last mentioned bell crank portion with said lift arm means so as to accommodate a limited amount of forward movement of said lower link means relative to the tractor, a link pivotally connected at its upper end with said lift arm means, and means including pin and slot means connecting the lower part of said last mentioned link with said bell crank means.

14. The combination with a tractor having a pivotally mounted lift arm, of a ground following implement, draft transmitting means connected at its rear end with said implement, bell crank means pivotally mounted on the tractor and having a first arm means, means operatively connecting said first arm means with the forward end of said draft transmitting means, whereby the pull of the tractor and the soil resistance acting against the implement tend to cause said bell crank to rotate in one direction, said bell crank means having a second arm means, said second arm means having an effective length appreciably greater than that of the first arm means, means operatively connecting said second arm means with said lift arm at a point on the latter between its outer end position and its point of pivotal connection with the tractor, and lift link means connecting the outer end portion of said lift arm with said draft transmitting means one of said operative connecting means including lost-motion means whereby the implement may swing relative to the tractor to accommodate pitching of the latter.

15. The combination with a tractor having a lift arm, of a ground following implement, draft transmitting means connected at its rear end with said implement, a motion-transmitting member pivotally mounted on the tractor and having a first portion pivotally connected with the forward end of said draft transmitting means whereby the pull of the tractor and the soil resistance acting against the implement tend to cause said motion transmitting member to rotate in one direction, said latter member having a second portion operatively connected with said lift arm, and means connecting said lift arm with said draft transmitting means, the means connecting said second portion with said lift arm including lost-motion means whereby the implement may swing relative to the tractor independently of said pivoted motion transmitting member.

16. The combination of a tractor having lift arm means, a draft creating implement, draft transmitting means connected adjacent its rear end with the implement, lift link means connecting said draft transmitting means with said lift arm means, lever means swingably mounted on the tractor, means connecting the forward end portion of said draft transmitting means with one end portion of the lever means, means comprising a pair of relatively movable parts connecting the other end portion of the lever means with said lift arm means, and means limiting the amount of permissive relative movement of said parts.

17. The combination of a tractor having lift arm means, a draft creating implement, draft transmitting means connected adjacent its rear end with the implement, lift link means connecting said draft transmitting means with said lift arm means, bell crank means swingably mounted on the tractor, means connecting the forward end portion of said draft transmitting means with one arm of the bell crank, means comprising a pair of relatively movable parts connecting the other arm of the bell crank with said lift arm means, means limiting the amount of permissive relative movement of said parts, and upper link means swingably connecting the upper portion of the implement with the tractor, whereby relative movement of said parts accommodate generally fore and aft movement of the lower forward portion of the implement relative to the tractor.

18. The combination of a tractor having lift arm means, a draft creating implement, draft transmitting means connected adjacent its rear end with the implement, lift link means connecting said draft transmitting means with said lift arm means, lever means swingably mounted on the tractor, means connecting the forward end portion of said draft transmitting means with one end portion of the lever means, and means comprising a pair of relatively movable parts connecting the other end portion of the lever means with said lift arm means, said movable parts including ratio-changing means effective between said lever means and said lift arm means.

References Cited in the file of this patent

UNITED STATES PATENTS

| 845,121 | Reniff | Feb. 26, 1907 |
| 1,044,055 | Johnson et al. | Nov. 12, 1912 |
| 1,404,544 | Rettig | Jan. 24, 1922 |
| 2,372,459 | Todd | Mar. 27, 1945 |
| 2,480,387 | Smith | Aug. 30, 1949 |
| 2,654,304 | Wilson | Oct. 6, 1953 |
| 2,672,082 | Frevik | Mar. 16, 1954 |
| 2,679,199 | Strehlow | May 25, 1954 |
| 2,785,616 | Jones | Mar. 19, 1957 |

FOREIGN PATENTS

| 155,707 | Australia | Mar. 16, 1954 |